United States Patent
Nagaraj et al.

(10) Patent No.: US 6,863,828 B2
(45) Date of Patent: Mar. 8, 2005

(54) PROCESS FOR SEPARATION AND RECOVERY OF POLYETHYLENE GLYCOL (PEG) FROM SPENT AQUESOUS TWO-PHASE SYSTEMS

(75) Inventors: Naveen Nagaraj, Karnataka (IN); Chethana Sampangi, Karnataka (IN); Sreesaila M. S. R. Karumanchi, Karnataka (IN)

(73) Assignee: Council of Scientific and Industrial Research, New Delhi (IN)

(*) Notice: Subject to any disclaimer, the term of this patent is extended or adjusted under 35 U.S.C. 154(b) by 0 days.

(21) Appl. No.: 10/396,125

(22) Filed: Mar. 25, 2003

(65) Prior Publication Data

US 2004/0188358 A1 Sep. 30, 2004

(51) Int. Cl.[7] .............................. C02F 1/30; B01J 19/12
(52) U.S. Cl. .................... 210/748; 210/800; 528/480
(58) Field of Search .............................. 210/634, 748, 210/767, 800; 219/687; 528/480, 503

(56) References Cited

U.S. PATENT DOCUMENTS

| 4,313,786 A | 2/1982 | Smith |
| 4,853,507 A | 8/1989 | Samardzija |
| 6,623,643 B2 * | 9/2003 | Chisholm et al. ........... 210/620 |

* cited by examiner

*Primary Examiner*—Frank M. Lawrence
(74) *Attorney, Agent, or Firm*—Ladas & Parry

(57) ABSTRACT

The preset invention relates to the process for the separation and recovery of polyethylene glycol (PEG) from spent aqueous two-phase systems (ATPSs). The present invention more particularly relates to the recovery of PEG from SPENT aqueous two-phase systems by the application of microwave energy.

5 Claims, 1 Drawing Sheet

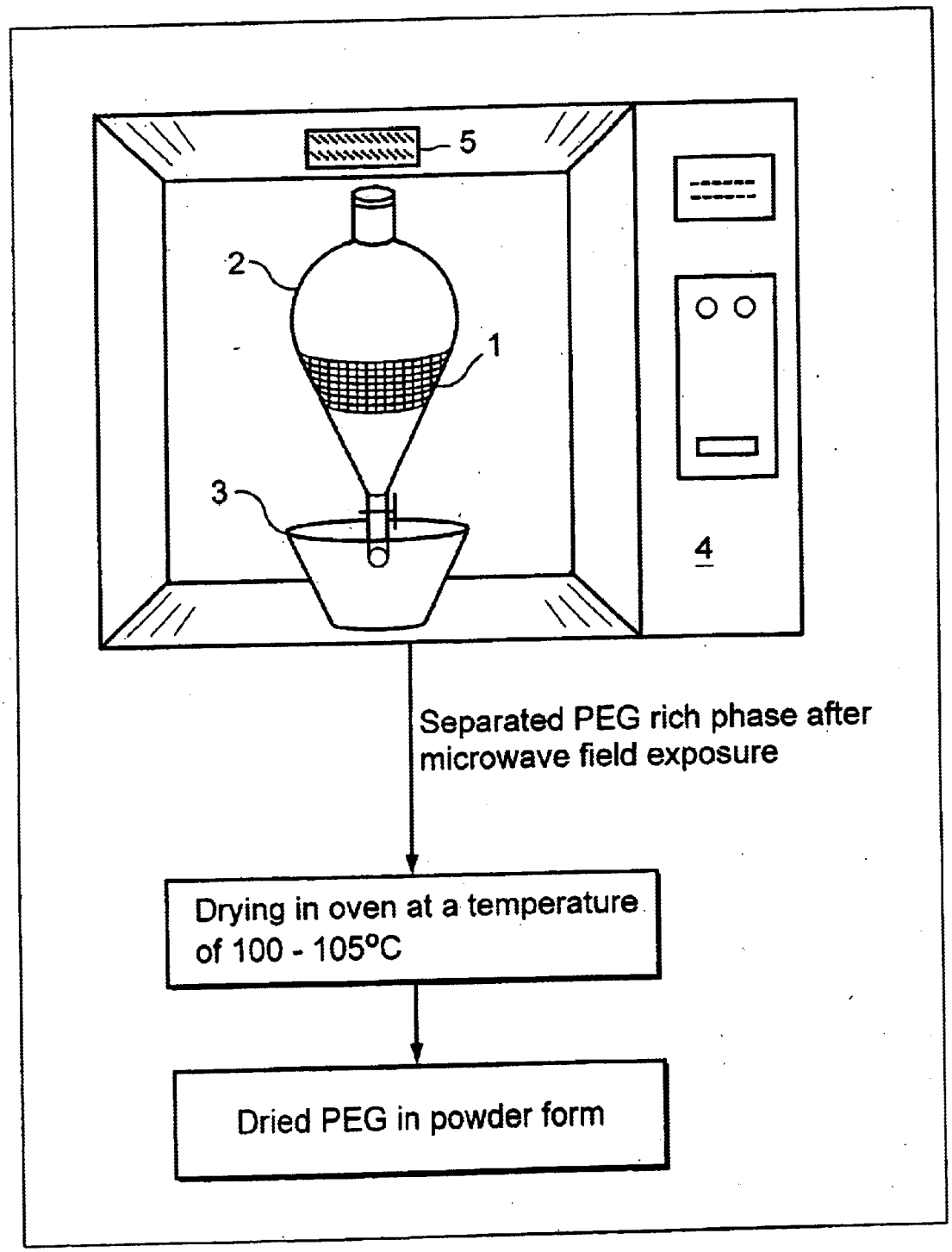

PROCESS FOR SEPARATION AND RECOVERY OF POLYETHYLENE GLYCOL (PEG) FROM SPENT AQUESOUS TWO-PHASE SYSTEMS

FIELD OF THE INVENTION

The present invention relates to the process for the separation and recovery of polyethylene glycol (PEG) from spent aqueous two-phase systems (ATPSs). The present invention more particularly relates to the recovery of PEG from SPENT aqueous two-phase systems by the application of microwave energy.

BACKGROUND OF THE INVENTION

Extraction using aqueous two-phase systems (ATPSs) is finding widespread application in separation, concentration, and purification of biological products such as proteins/enzymes, viruses, cells and other biomaterials from fermentation broth and cell culture media. Use of ATPE quite essentially reduces the water load, removal of cell debris, polysaccharides, nucleic acids etc. and reduces the number of subsequent processing steps. Major hindrances for the widespread adaptation of ATPE on industrial scale is the high cost of phase forming polymers and environmental problems arising due to the disposal of phase forming polymers after the extraction of biomolecules. Hence, there is a need for the polymer separation and recovery from ATPSs after extraction of biomolecules. Presently, polymer phase recycling is being employed after the extraction of biomolecules in order to improve the economics of the process. However, in this method there is chance for the contaminates which is previously present in the polymer phase getting into the phase system instead of separating from the biomolecules. This results in reduction in desired levels of purity of the biomolecules in large-scale operations. Conventional methods like evaporation, vacuum drying alone are economically unviable for the polymer recovery from ATPSs due to high-energy requirements and need of special equipments for the creation and maintenance of required vacuum. Also, these methods take longer duration for the complete recovery of PEG due to presence of high amount of water along with the polymer. Hence, there exists a need for an economically viable method for the complete recovery of PEG from spent two-phase systems after extraction of biomolecules. Additionally, a need exists for the application of external field such as microwave field coupled along with conventional hot air drying to separate and completely recover PEG from spent ATPS at an faster rate with minimal use of energy.

Reference may be made to (Harries and Yalpani, 1985, Polymer-ligands used in affinity partitioning and there synthesis. In "Partitioning of aqueous two-phase systems" Eds. Walter et al. pp 589–626, Academic Press, New York) recovery of PEG in dry form is accomplished by cooling to give recrystallization or by precipitation with ether. In this method use of chemicals such as ether is undesirable, even detrimental since the recovered polymer has to reused for the extraction of biomolecules. Moreover, additional processing steps are essential to remove ether. Also, another way to get dry PEG is by maintaining vacuum at a temperature of 110–120° C. In this method the recovery of PEG takes long time and the use of vacuum makes it economically unviable in large scale operations.

Reference is made to recycling of polymer-rich phase in two stage aqueous two-phase systems for the recovery of yeast bulk protein, pyuruvate kinase and fumerase (Palomares and Lyddiatt, 1996, J. Chrom. B, 680, 81–89). However, in this method of polymer is partially recycled along with the biomolecule and also protein purification level achieved is low when polymer is recycled due to presence of contaminants in the recycled polymer phase.

Reference is made to (Johnson, 1994, Methods in Enzymology, Vol. 228, pp-571) wherein copolymer of ethylene oxide and propylene oxide are used to form the phase systems. Those polymers are recovered by increasing the temperature. However, in this method the polymers were recovered as a mixture of both the polymers. It may be noted that all these methods referred here refer to recovery of polymers by precipitation, recrystallization or by vacuum or recycling of polymer back or recovery in the form of mixture of two polymers. These methods are employed for subsequent separation, extraction and purification of biomolecules by the formation of ATPSs. This method is more suitable for the recovery of only thermosetting polymer and is not suitable for the separation and recovery of PEG.

There are no reports available in the liter on the recovery of dry PEG from ATPSs with the application of external field such as microwave field.

OBJECTS OF THE INVENTION

The main object of the present invention is to provide a process for the separation and recovery of PEG from spent ATPSs.

Another object of the present invention is to exploit the application of microwave field coupled with hot air drying for PEG recovery from ATPSs.

Still another object of the present invention is to provide a faster economic method for the separation and recovery of PEG from ATPSs completely.

Yet another object of the present invention is to facilitate the easier separation of industrially important biomolecules.

SUMMARY OF THE INVENTION

Accordingly the present invention provides a process for the separation and recovery of PEG from spent aqueous two-phase systems, which comprises (as shown in the FIGURE)

a) Separation of PEG-rich top phase from spent ATPS.

b) The separated PEG-rich phase is subjected to microwave field in an microwave oven (4) consisting of frequency 900–2450 MHz with an power out put of 175–800 watts.

c) The PEG-rich phase is exposed to microwave field for time duration of varying from 1.5–3 minutes, or until the dispersion forms two phases leaving out water to form the bottom phase and the top phase rich in PEG.

d) The PEG-rich phase is separated then dried in hot air oven for a duration of 45–60 minutes at an temperature of 100–105° C. to obtain dried and powdered PEG with an recovery of 94–95%.

In another embodiment of the present invention, separation and recovery by the above process can be employed of PEG having a molecular weight varying from 1500–20,000.

BRIEF DESCRIPTION OF THE ACCOMPANYING DRAWING

The FIGURE is a schematic representation of the experimental set of the invention.

DETAILED DESCRIPTION OF THE INVENTION

The invention will now be explained with reference to the FIGURE of the drawing which represents the schematic diagram of the experimental set-up. In the FIGURE, the PEG rich top phase is separated from the salt or other from the phase systems prepared from fresh PEG and recovered PEG.

TABLE 1

Recovery of PEG using microwave field.

| Phase system | Top phase before exposure, g | Exposure time, min | PEG-rich Phase separated after Exposure, g | PEG-rich Phase After Drying, G | % recovery | Density of PEG-rich phase, kg/m³ | | Viscosity of PEG-rich phase, mPas | |
|---|---|---|---|---|---|---|---|---|---|
| | | | | | | Before | After | Before | After |
| Micro mode (only microwave heating) | | | | | | | | | |
| 16.07/ 10.13 | 30.0 | 1.5 | 23.6 | 10.17 | 94 | 1082.5 | 1082.9 | 26.95 | 29.8 |
| Combi-mode (microwave/Convective heating) | | | | | | | | | |
| 16.07/ 10.13 | 30.0 | 3.0 | 22.6 | 11.1 | 95 | 1082.5 | 1081.9 | 26.95 | 28.48 | polymer rich phase (1) is taken in a separating funnel (2) which is placed over a stand (3) inside an microwave oven (4) which transmits the microwave field from the magnetron (5) at a specified frequency and power intensity to the PEG rich phase (1). After the microwave field exposure the PEG rich top phase forms two-phase, wherein only the top PEG-rich phase is separated taken in a petridish and dried in an hot air oven at an temperature of 105° C. (6) to of dry PEG.

The process of the invention comprises the separation and recovery of PEG from spent aqueous two-phase systems which comprises (as shown in the FIGURE of the drawing):

(a) separating PEG-rich top phase from spent ATPS.

(b) subjecting the separated PEG-rich to microwave field in an microwave oven (4) consisting of frequency 900–2450 MHz with an power output of 175–800 watts.

(c) exposing the PEG-rich phase to microwave field for time duration of varying from 1.5–3 minutes, or until the dispersion forms two phase leaving out water to form the bottom phase and the top phase rich in PEG.

(d) separating PEG-rich phase and then drying in hot air oven for a duration of 45–60 minutes at an temperature of 100–105° C. to obtain dried and powdered PEG with an recovery of 94–95%.

The separation and recovery by the above process can be employed of PEG having a molecular weight varying from 1500–20,000.

In the present invention, the separated top PEG rich phase is taken in a separating funnel which is placed over a stand inside a microwave oven. The microwave field is applied from the magnetron, till vigorous movement is observed in the PEG-rich phase. The microwave field is withdrawn and the PEG-rich top phase is allowed to cool at room temperature. PEG-rich phase upon cooling separates into two distinct phases, which are then separated and arm weighed initially. The separated top phase and bottom phase are then dried in hot air oven at 105° C. to remove the remaining water. Weights of dried top phase and bottom are noted and compared with initial weights before drying to account for the recovery of PEG. Further, the physical properties such as density, viscosity, moisture content of the recovered PEG were estimated as shown in Table 1. Also, partition coefficient e d unaffected for the partitioning studies carried out In conventional process water which is present along with the PEG is removed by vacuum drying at a temperature of 110–120° C. or by precipitation with chemicals such as ether. Moreover, the vacuum drying is slow and difficult to scale up and requires costly equipment for the production and maintenance of required vacuum. In otherwords, the recovery of PEG itself is quite tedious owing to larger amount of water load present along with the PEG.

The novelty of the preset invention is that the application of microwave field results in dipole rotation of free water molecules present along with the PEG, associated with temperature rise. This increase in temperature makes PEG more hydrophobic, driving the water out from PEG-rich phase. This forms a separate bottom along with some amounts of salt getting stripped out from PEG-rich phase. Removal of water from PEG-rich phase enables in the faster recovery of PEG by hot air drying at an comparably less time duration with less energy consumption.

The following examples are given by way of illustration of the present invention and therefore should not be construed to limit the scope of the present invention.

EXAMPLE 1

30 g of PEG rich top phase which is separated from ATPSs (1) consist of 16.07% PEG and 84% water was taken in a separating funnel (2) placed over a stand (3) inside a microwave oven, The separated PEG rich top phase was exposed to microwave field applied from magnetron (5), which was set in a micro mode maintained at a frequency of 2450 MHz throughout the experiment at an temperature of 110° C. The experiment was continued till the dispersion was formed two phases (for a time duration of 1.5 minutes). The top and bottom phase were separated and dried individually in a hot air oven maintained at the temperature of 105° C. The product thus obtained was estimated to have a recovery of 94% PEG.

EXAMPLE 2

30 g of PEG rich top phase which is separated from ATPSs (1) consisting of 16.07% PEG and 84% was taken in a separating funnel (2) placed over a stand (3) inside a microwave oven. The separated PEG rich top phase was exposed to microwave field applied from magnetron (5), which was set in a micro mode maintained at a frequency of 2450 MHz throughout the experiment at an temperature of 120° C. The experiment was continued till the dispersion formed two phases. The top and bottom phase were separated and dried individually in a hot air oven maintained at the temperature of 105° C. The product thus obtained was estimated to have a recovery of 95% PEG.

The Main Advantages of the Present Invention are:
1. Significantly contributes to the easy and effective recovery of PEG from ATPSs.
2. Enables overcoming the environmental hazards involved in disposing of PEG.
3. Enables to have higher efficiency and faster recovery of PEG over conventional processes of polymer recovery.
4. Enables the overcoming of the main bottleneck in the industrial recovery method of PEG, by eliminating the use of precipitating agent.

Due to the present invention, these could be accomplished by the removal of water as well as without the use of precipitating agents, which in turn cost of PEG recovery drastically and also obtain PEG free from chemical (such as salt and precipitating agents).

We claim:

1. A process for the separation and recovery of polyethylene glycol from a spent aqueous two-phase system, which comprises a) separating the polyethylene glycol (PEG) rich top phase from spent aqueous two phase system (ATPS);

b) subjecting the separated PEG-rich phase to a microwave field;

c) exposing the PEG-rich phase the microwave field for time duration in the range of 1.5–3 minutes, or until the dispersion forms two phases leaving out water to form the bottom phase and a top phase rich in PEG;

d) separating the PEG-rich top phase and drying to obtain dried and powdered PEG with an recovery of 94–95%.

2. A process as claimed in claim 1 wherein in step (b), the microwave field is of a frequency in the range of 900–2450 MHz and at a power out put of 175–800 watts.

3. A process as claimed in claim 1 wherein step (b) is carried out in a microwave oven.

4. A process a claimed in claim 1 wherein the drying step (e) is carried out in a hot air oven for a time period in the range of 45–60 minutes and at an temperature in the range of 100–105° C.

5. A process as claimed in claim 1 wherein the polyethylene glycol has a molecular weight in the range of 1500–20,000.

* * * * *

UNITED STATES PATENT AND TRADEMARK OFFICE
CERTIFICATE OF CORRECTION

PATENT NO. : 6,863,828 B1
DATED : March 8, 2005
INVENTOR(S) : Naveen Nagaraj et al.

It is certified that error appears in the above-identified patent and that said Letters Patent is hereby corrected as shown below:

<u>Title page, Item [54] and Column 1, line 3,</u>
Tilte, "AQUESOUS" should read -- AQUEOUS --.

Signed and Sealed this

Twenty-fourth Day of May, 2005

JON W. DUDAS
*Director of the United States Patent and Trademark Office*